United States Patent

[11] 3,573,419

| [72] | Inventor | Harold R. Henderson<br>Lancaster, Ohio |
|---|---|---|
| [21] | Appl. No. | 768,044 |
| [22] | Filed | Oct. 16, 1968 |
| [45] | Patented | Apr. 6, 1971 |
| [73] | Assignee | Arcair Company<br>Allentown, Pa. |

[54] CUTTING AND GOUGING TORCH
16 Claims, 7 Drawing Figs.

[52] U.S. Cl. .................................................. 219/70,
219/138, 219/146
[51] Int. Cl. ........................................................ B23K 9/00,
B23k 9/28
[50] Field of Search ........................................... 219/70,
138, 144

[56]    References Cited
UNITED STATES PATENTS
2,524,223  10/1950  Giroux .......................... 219/70
2,706,236  4/1955  Stepath et al. ................. 219/70
2,899,536  8/1959  Hoese et al. ................... 219/70
2,990,468  6/1961  Mankouski ..................... 219/70
          FOREIGN PATENTS
1,057,703  5/1959  Germany ....................... 219/70

*Primary Examiner*—J. V. Truhe
*Assistant Examiner*—Hugh D. Jaeger
*Attorney*—Beveridge & DeGrandi ABSTRACT: This invention involves an improved design of the air-carbon arc type of cutting and gouging torch in which an elongated electrode is gripped by an electrode clamp with a portion of the electrode length exposed and projecting freely toward the workpiece so an arc may be struck and maintained between the electrode tip and the work and a nozzle connected to a source of high pressure gas, preferably air, disposed immediately adjacent where the electrode is gripped to direct a stream of gas along one side of the exposed length of the electrode toward its tip substantially parallel to the axis of the electrode to blow molten metal of the workpiece from beneath the arc.

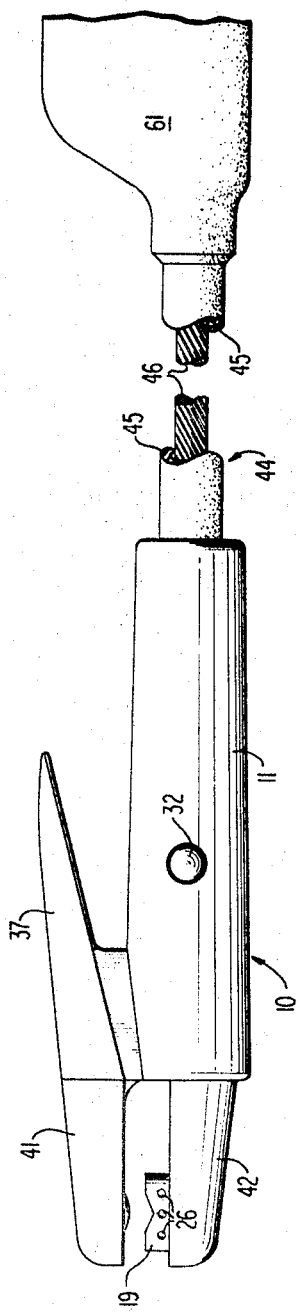
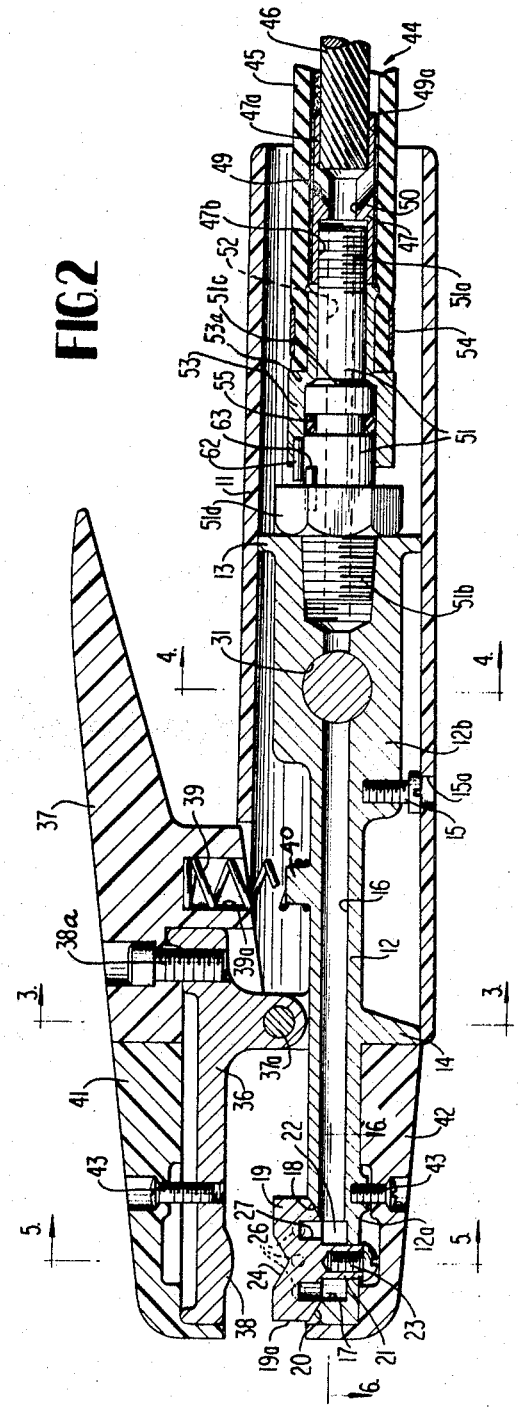
INVENTOR
HAROLD R. HENDERSON
BY Browne, Schuyler & Beveridge
ATTORNEYS

PATENTED APR 6 1971

INVENTOR
HAROLD R. HENDERSON

BY  Browne, Schuyler & Beveridge

ATTORNEYS

CUTTING AND GOUGING TORCH

This invention relates to an improved air-carbon arc cutting and gouging torch and particularly to a torch in which the angular position of the electrode with respect to the torch may be effectively controlled and in which the torch can be easily swiveled relative to the connecting air and electrical power leads.

The present torch is an improvement over the basic air-carbon arc cutting and gouging torch originally disclosed in U.S. Pat. No. 2,706,236. As indicated in that patent a solid rod consumable electrode is gripped in a clamp connected to a source of electrical power with a portion of the length of the electrode exposed and projecting freely toward the workpiece so that an arc may be struck and maintained between the tip of the electrode and the work, thus forming a pool of molten metal beneath the arc. A clamp grippingly holds the electrode in engagement with a rotatable head carried by the handle of the torch so that the longitudinal axis of the electrode may be angularly adjusted relative to the longitudinal axis of the handle of the torch. The rotating head has one or more nozzles which are connected to a source of high pressure gas via passages extending through the handle and the discharge of the nozzle or nozzles is laterally offset from the electrode and directed along one side of the electrode toward its tip substantially parallel to the electrode axis so that gas from the nozzle impinges on the molten metal and blows it from beneath the arc to effect a uniform gouging action as the electrode is consumed. As noted in the aforementioned patent the torch affords a rapid, easily controlled and efficient method for cutting and gouging metal by using ordinary solid-rod carbon electrodes. Although cutting and gouging by this type of equipment is widely known as air-carbon arc cutting, the gas utilized need not necessarily be air. However, since the purpose served by the high pressure gas is essentially a mechanical scouring action to remove from beneath the tip of the electrode the metal which has become molten by the heat of the arc, air has been used almost exclusively as being the most economical and practical gas for this purpose. Hence the term air is used in the disclosure as an indication of the gas used in commercial practices and not for the purpose of indicating that no other gas but air could be used.

Although the torch disclosed in the aforementioned U.S. Patent was a distinct advance in the state of the art and provided an entirely new method of cutting and gouging metal, which has become known in the industry as the air-carbon arc cutting method, the torch had certain deficiencies. The angular relationship between the handle and the axis of the electrode is adjustable by pivoting the chuck or head to which the electrode is clamped by a suitable clamping arrangement. In the torch shown in the aforementioned patent the lower portion of the swiveling head is a flat surface that is frictionally held in contact with the corresponding flat surface of the forward portion of the body of the torch by a screw extending from the torch body into the swiveling head. This design presents a problem in establishing the desirable amount of friction between the rotating head and the torch body and at the same time keeping the electrical resistance between the rotating head and the torch body at a sufficiently low value. To permit the torch operator to most effectively utilize the torch, the amount of force which is required to exert on the electrode to rotate the nozzle head should not be too great. However, if the frictional force exerted between the nozzle head and the torch body is too low, the electrical resistance would increase to the point where too much heat would be generated and the electrical efficiency of the torch would be impaired. Therefore, maintaining a proper balance between the force which is required to rotate the nozzle head and the degree to which the head must be tightened to the body in order to maintain the electrical resistance at an acceptable amount has posed considerable problems.

Another problem involved in utilizing this torch has been that of being able to rotate the torch about its longitudinal axis while performing the cutting and gouging operations. Since a high volume of air must be constantly supplied to the torch while being operated, the air hose from the source of high pressure air must be affixed to the handle of the torch as well as the relatively large cable leading to the electrical power supply. As may be noted in the aforementioned patent, it is most convenient to arrange the electrical cable concentrically within the air hose and connect both to the base of the handle of the torch through a suitable fitting. By this arrangement the hose conduit is not only an electrical insulator for the cable but the air in the conduit will cool the electrical cable. In this arrangement, whereas the electrical cable has considerable torsional flexibility, the air hose has a high degree of torsion rigidity, thus making it extremely difficult to rotate the torch about its longitudinal axis.

Other deficiencies have existed in the torch disclosed in the above-identified patent which have detracted from its utility. In order to dissipate the heat generated by the torch, it has been the practice to leave a large amount of the area of the conductive portion of the torch exposed to the air, as may be seen in the disclosure of the patent mentioned above. However, the relatively large area of the electrically conducting body of the torch creates safety problems. Various other aspects of the torch shown in U.S. Pat. No. 2,706,236 make it difficult and awkward to use.

A basic objective of this invention is to provide an improved cutting and gouging torch which will provide the maximum degree of flexibility and safety to the operator.

Another object of this invention is to provide an improved cutting and gouging torch in which the angular position of the electrode with respect to the axis of the torch can be easily and readily adjusted by the operator.

Still another object of this invention is to provide an improved torch with a maximum degree of flexibility of motion about all axes, including its longitudinal axis.

Still yet another object of this invention is to provide an improved torch having a high degree of safety and which will accommodate a large volume of air.

These objects have been achieved through providing a torch in which the supporting surface for the rotatable nozzle head, which grips the electrode, is inclined and frustoconical in shape to provide a wedging action with the supporting body of the torch, a novel swivel coupling connects the concentrically arranged electrical and air supply to the handle of the torch, the electrically conducting portion of the torch body is fully insulated in a manner to conduct a minimum of heat to the handle held by the operator, the electrodes can be quickly and easily removed and inserted from the torch by use of a pivoting clamping arm and the air supply flows to the nozzle by a direct and straight passage through a value with a straight and open passage.

Other objects, advantages and features of the invention will become apparent to those skilled in the art in accordance with the disclosure of the following detailed description of a preferred embodiment of the invention as illustrated in the accompanying sheets of drawings in which:

FIG. 1 is a side elevation of the torch and its swivel coupling.

FIG. 2 is a sectional elevation of the torch and a portion of the coupling shown in FIG. 1.

Figure 3:
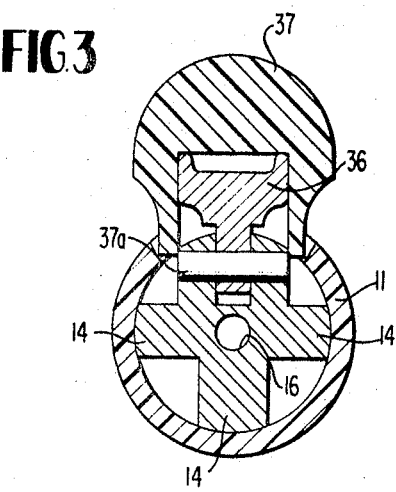
FIG. 3 is a sectional view taken along section 3-3 of FIG. 2.

Referring first to FIGS. 1 and 2, the cutting and gouging torch 10 has a generally cylindrical, hollow handle 11 of insulating material by means of which the operator holds and guides the torch. The inside diameter of the hollow handle tapers from a slightly smaller diameter at the rear end of the handle to a somewhat larger diameter at its forward end. An elongated electrically conducting body 12 is contained within the interior of the handle 11 with the forward portion 12a of the body extending forwardly of the handle, the rear end of the body 12 having a projecting flange 13 of a diameter which will snugly fit against the interior wall of the handle approximately midway between the forward and rear portions. As best seen in FIG. 3, radially extending shoulders 14 project outwardly from the forward portion of the body into contact with the forward interior surface of the handle 11 to provide support for the forward portion of the body. A body screw 15 tapped into the central, lower portion of the body provides the necessary wedging action to hold the body 12 within the handle 11, availability of the body screw 15 for adjustment being through the small hole 15a in the handle beneath the screw 15. An interior passage 16 extends in a straight line longitudinally of the body 12 generally along its central axis. The forward, upper portion of the body 12 contains a cavity or recess of which the lower portion 17 is a circular bore with vertical sidewalls at substantially the same level with the internal passage 16 which pierces the rear sidewall of the lower recessed portion 17. The upper portion of the recess in the body slopes upwardly and outwardly from the vertical wall of the lower portion of the recess to form the frustoconical shaped upper recess segment 18, which is the supporting surface for the nozzle head 19 that fits therewithin.

Figure 4:
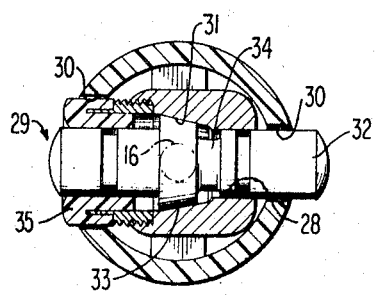
FIG. 4 is a sectional view taken along section 4-4 of FIG. 2 to show the interior construction of the air valve.
Figure 5:
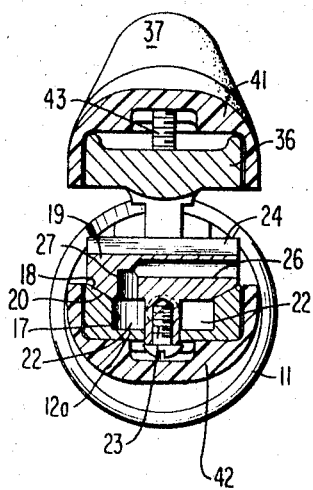
FIG. 5 is a sectional view taken along section 5-5 of FIG. 2.
Figure 6:
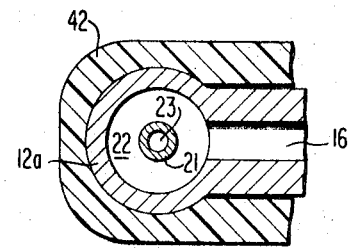
FIG. 6 is a sectional view taken along section 6-6 of FIG. 2.

The nozzle head 19 is generally circular in cross-sectional shape with straight cylindrical sidewalls 19a defining the upper portion at the lower end of which is an inwardly tapering seat area 20 that forms an annular frustoconical surface complementary to the conical supporting surface 18 of the upper recess segment. A central stem 21 of the nozzle body extends downwardly, concentrically within the lower bore 17 of the torch body to create an annular passage 22 within the body recess 17 that connects the body air passage 16 with the lower surface of the nozzle head 19 between its central stem 21 and the conically tapered seat 20. The nozzle head 19 is rotatably affixed to the body 12 by means of the screw 23 which screws into a hole tapped into the bottom of the stem 21 of the head, the stem 21 extending very slightly below the bottom of the body 12 so that the head 19 does not bind when the screw 23 is fully screwed into the stem. The top surface of the upper portion of the head 19 contains a transversely extending groove 24 in which the electrode is positioned with the axis of the electrode extending substantially along the axis of the groove. Three parallel nozzle channels 26 extend from the front of the nozzle head sidewall 19a into the interior of the head below and generally parallel to the groove 24 in a symmetrical relationship to the groove, the rear portion of the nozzle channels 26 being joined by an internal, vertically extending arcuate groove 27 which opens into the annular passage 22 in the lower portion of the body recess, thus providing direct communication between the body internal passage 16 through the annular passage 22, the vertical groove 27 to the nozzle channels 26 from which air is directed in streams substantially parallel to the groove 24 and the axis of an electrode disposed in the groove. The rear portion 12b of the elongated body 12 is substantially thicker in cross section than the remaining portions of the body and is pierced by the transversely extending valve bore 28 into which a sliding spool valve 29 is installed, portions of which protrude through corresponding access holes 30 in the handle. The valve bore 28 is tapered in the region of the internal passage 16 to form the tapered seat 31 against which the tapered land portion 33 of the valve spool 32 seats when the valve is in the closed position as illustrated in FIG. 4. The valve spool 32 is retained in position for transverse movement, between the closed position of FIG. 4 and an open position with the groove 34 of the spool in line with the valve ports, by the bonnet 35 screwed into the side of the rear portion 12b of the torch body.

An electrode clamping arm 36 is pivotally connected to the body 12 by the pivot 37a to extend forwardly and overlie the forward portion 12a of the body and the nozzle head 19, the forward end of the clamping arm 36 having the protruding knob 38 above the groove 24 in the nozzle head for engaging the top of an electrode positioned in the groove. A clamping arm lever 37 is affixed to the rear of the clamping arm 36 by suitable means such as the bolt 38a such that the lever 37 extends rearwardly over the top of the handle 11 with a compression spring 39 fitted around the stud 40 on the body and extending upwardly into the recess 39a in the lever to bias the clamping arm 36 in the normally closed position against an electrode resting on the nozzle head 19. The biasing action of the spring 39 on an electrode presses the frustoconical supporting surface 20 of the head against the complementarily shaped supporting surface 18 of the recess to establish the desired degree of wedging action so the rotation of the head can be controlled while the electrical resistance between the head and the body is minimized. Upper and lower insulating boots 41 and 42 are affixed to the clamping arm 36 and to the lower forward portion 12a of the body by suitable screw fastenings 43, thereby covering the exterior surfaces of these electrically conducting elements.

As can be seen in FIGS. 1 and 2, electrical power is connected to the body 12 and a source of high pressure air transmitted to the internal passage 16 and nozzle orifices 26 through the concentric cable 44 connected to the rear of the body 12 of the torch by the swivel coupling to be subsequently described. The concentric cable 44 is a fluid conduit or hose 45 having a torsionally resilient electric cable 46 extending internally through its length and provided with suitable fittings to provide a swivel coupling through which the electric cable and internal passage of the hose are operatively connected to the rear of the torch body 12. A generally tubularly shaped metal coupling 47 is permanently affixed at one end 47a around each of the two ends of the cable 46 by appropriate means as crimping or swaging. The unattached end of the coupling 47 opposite the end 47a that is crimped around the cable 46 is formed as an internally threaded female connector recess 47b. An air channel 50 of smaller diameter than the connector recess 47b extends internally of the coupling from the female connector recess 47b to the interior of the other end 47a that is affixed around the cable. Two holes 49 are drilled on diametrically opposite sides of the coupling to extend from the air channel 50 to the outer surface of the coupling overlying the end of the cable 46, shallow grooves 49a of the same diameter extending along the coupling to its end overlying the cable to provide a passage for air to pass from the interior of the hose 45, along the groove 49a through the holes 49 and to the air channel 50. An elongated metal terminal 51 having an internal air passage 52 that extends from one end to the other is affixed to one coupling 47 by means of a male connection 51a at one end of the terminal, the male connection 51a screwing into the corresponding female connection 47b of the coupling 47 so that the air passage 52 communicates with the air channel 50 of the coupling. The forward end of the terminal 51 has a tapered screw connection 51b which screws into a corresponding recess in the after section 12b of the body 12. A hollow sleeve 53 rotatably fits over the cylindrical midportion of the terminal 51, the sleeve 53 having a shoulder 53a connecting the two ends of the sleeve which are of different diameters and overlying a similar shoulder 51c on the terminal. The shoulder 51c on the terminal and the coupling 47 abutting the end of the terminal to prevent axial movement of the sleeve 53 with respect to the terminal 51. The forward end of the hose 45 abuts the shoulder 53a of the sleeve 53 and is sealingly clamped around the forward portion of the sleeve 53 by the hose clamp 54. The terminal 51 is rotatable about its longitudinal axis with respect to the sleeve 53 in an airtight relationship with a sealing O-ring 55 retained in a groove in the terminal. A pin 62 affixed to the forward end of the sleeve 53 engages a projecting pin 63 affixed to the hexagonal head 51d of the terminal 51 to prevent relative rotation of the terminal and sleeve through more than 360°.

Figure 7:
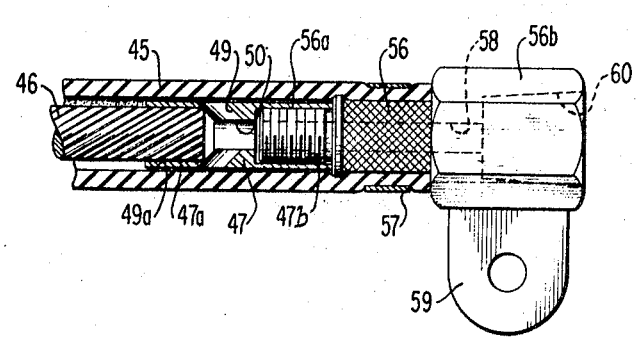
FIG. 7 is a sectional elevation of the other end portion of the swivel coupling that is not shown in FIG. 2.

Referring to FIG. 7, the female connection 47b of the other coupling 47 that is affixed to the other end of the cable 46 connects to a corresponding male connection 56a at the forward end of the connector 56 which is sealingly fixed within the other end of the hose 45 by the hose clamp 57, the connector 56 having a longitudinally extending internal air passage 58 that communicates with the air channel 50 of the coupling 47. The rear end portion of the connector 56 has a hexagonal head 56b from which protrudes an ear 59 to which the external power connection is made and which has a tapered internal connection 60 into which the source of high pressure air is connected that supplies the air that flows into the interior of the hose 45 via the air passage 58 of the connector 56, the air channel 50 of the coupling 47 and the holes 49 and grooves 49a in the coupling. This air then flows through the hose of the swivel coupling and the other air passages indicated above and through the central air passage 16 of the torch body to the orifices 26 of the nozzle head. The connector 56 is encompassed in the insulating boot 61.

The manner in which this improved torch is utilized in cutting and gouging metal by the air-carbon arc process is substantially the same as first disclosed in the aforementioned U.S. Pat. No. 2,706,236. An ordinary solid rod carbon electrode is gripped near one end between the clamping arm 36 and the nozzle head 19 with the electrode lying in the groove 24 so that the major portion of its length is exposed and projects away from the nozzle head 19 toward the workpiece with the nozzle channels 26 substantially parallel to the axis of the electrode. The operator holds the torch by the handle 11 with the nozzle head 19 pivoted to a position such that the electrode is disposed at an angle relative to the longitudinal axis of the torch and the tip of the electrode is brought in close proximity to the work to strike an arc between the work and the electrode tip. The arc is maintained to heat and melt that portion of the work to be gouged and concurrently with this heating and melting of the work beneath the arc the operator maintains the valve 29 in an open position to cause streams of air from the orifices 26 to be directed along the exposed surface of the electrode toward the tip and blow the molten metal from beneath the tip of the electrode. The operator controls the shape and size of the cut or gouge channel by moving the electrode along the workpiece. Although the electrode is consumed in this operation, no adjustment of the air nozzle is necessary as the length of the electrode decreases due to the parallel relationship between the air stream and the electrode axis as long as the operator holds the torch so that air passes beneath the tip of the electrode and the work. As the electrode is moved along the work in producing a gouged channel, the swivel coupling permits the operator to freely rotate the torch about its longitudinal axis. As the relationship between the operator and the work changes, the operator may also modify the angular relationship between the electrode and the longitudinal axis of the torch by causing the nozzle head 19 to pivot about its central axis. Due to the two degrees of freedom of motion established by the swivel coupling and the rotatably nozzle head, the operator retains a high degree of maneuverability over the torch and can gouge channels with a high degree of accuracy. In particular, the wedging action of the frustoconical supporting surfaces of the head and body recess create a degree of controllability over the rotation of the head not heretofor possible.

While the above description and illustrations show a preferred embodiment of this torch, it should be understood that this invention is not intended to be restricted solely to the specifically described subject matter but that it is intended for all modifications of the described embodiment to be covered which would be apparent to one skilled in the art and which fall within the spirit and scope of the invention typified by this disclosed embodiment.

I claim:

1. A cutting and gouging torch comprising:
   an elongated metal body having an internal passage extending longitudinally thereof;
   said body having a connection at one end for connecting said body to an electrical power source and the corresponding end of said passage to a source of high pressure air;
   a hollow handle of insulating material;
   means retaining at least a portion of said body within said handle;
   the upper, forward portion of said body opposite said one end containing a recess having a lower portion and an upper portion extending upwardly and outwardly therefrom in the form of a frustoconical surface with said body internal passage connecting to said lower recess portion;
   a nozzle head having a frustoconical lower portion complementary in shape to that of said upper body recess portion slidably supported therewithin for rotation about its central axis and having an upper portion with a peripheral sidewall extending vertically above said body;
   said head being adapted to support an electrode with its axis aligned in a predetermined direction transversely of said head;
   the upper sidewall of said head having at least one orifice from which a stream of air is emitted to pass substantially parallel to said predetermined direction of the axis of an electrode supported by said head;
   said head containing an internal passage connecting said orifice to said lower recess portion and said body internal passage;
   clamping means affixed to said body for maintaining an electrode in gripping engagement with said nozzle head with the electrode in said predetermined direction and a portion of the electrode length exposed to extend away from said head substantially parallel to the air stream emitted from said orifice; and
   valve means for controlling air flowing through said body internal passage from the high pressure air source.

2. A cutting and gouging torch as described in claim 1 wherein the lower portion of said body recess is a circular bore extending downwardly into the body from the lower perimeter of said frustoconical shaped upper portion and containing an aperture defining the end of said internal passage;
   said head has a central stem protruding downwardly concentrically within said bore, thereby establishing an annular passage concentrically around said head central stem;
   said head contains a transversely extending groove in which an electrode is clampingly retained by said clamping means;
   said orifice being the outer extremity of a duct extending into the upper portion of said head parallel to said groove and then vertically into communication with said annular passage beneath the lower surface of said head; and
   fastening means connecting into said central head stem for rotatably connecting said head to said body for rotation about the axis of the stem.

3. A cutting and gouging torch as described in claim 2 wherein said groove extends transversely across the top surface of said nozzle head and said clamping means includes a clamping arm of electrically conducting material pivotally mounted on said body in an overlying relationship to said nozzle head with the arm pivoting toward and away from said head;
   a clamping lever of insulating material affixed to said arm and extending over said handle; and
   biasing means normally pivoting said clamping arm toward said nozzle head to clamp an electrode positioned in said groove between said head and said clamping arm.

4. A cutting and gouging torch as described in claim 3 wherein said handle is a hollow tube having a longitudinally tapered interior in which the internal diameter decreases in the direction of the tube length from one end;
   said body has a front tubular portion extending forwardly of a rear portion of the body at said one end in which said front portion has a substantially smaller cross section than said rear portion of the body;
   said recess being at the forward end of said front body portion;
   said rear body portion has a circumferential flange extending outwardly from adjacent the end of said body and of the same diameter as the interior of said tube intermediate its ends;

the front tubular portion of said body has at least one projection extending radially outwardly of said body transversely thereof in which the outer periphery defines an arc having the same radius as the interior of the larger end of said tube; and wedging means extend between said tube and said body intermediate said flange and body projection for wedgingly retaining said body within said tube handle with said body projection at said one end of said handle of greater interior diameter and the remainder of the body within said handle with said flange engaging the tube interior.

5. A cutting and gouging torch as described in claim 4 wherein said body internal passage is a straight and continuous passage extending internally of said body, and said valve means is a sliding spool valve contained in a cavity extending transversely through said read body portion and adjacent handle in which the land and groove of the spool of said valve being alternately movable into alignment with said body internal passage.

6. In a cutting and gouging torch having an electrode supporting head mounted for rotation about the longitudinal axis of the torch in which the head grippingly engages an elongated electrode having a portion of its length exposed to project freely toward the work so an arc may be struck and maintained between the electrode tip and the work, and the head contains at least one air nozzle connected to a source of high pressure air which flows in a stream from the nozzle along the exposed length of the electrode toward its tip substantially parallel to the electrode axis and blows melted metal from beneath the arc;

the improvement of said head being rotatably supported within an upwardly facing recess at one end of a metal body connected to a source of electrical power and affixed to a handle of said torch;

the upper wall of said recess sloping upwardly and outwardly to define a frustoconical surface;

the lower portion of said head having a frustoconically shaped surface complementary in shape to that of said recess and in which said head lower portion is slidably supported for rotation about its axis;

securing means rotatably connecting said head to said body permitting the frustoconical surfaces of said head and recess to slide rotatably one against the other;

the upper portion of said head projecting above said body being defined by a vertically extending sidewall containing at least one orifice; and said head having an internal nozzle channel extending between said orifice and the lower portion of said head within said recess for communication with an air passage extending through said body from said recess to a connection to an air supply.

7. The improved cutting and gouging torch described in claim 6 wherein said recess extends downwardly into said body from the lower edge of said upper wall as a circular recess of which the rear wall is pierced by said air passage;

said head has a central stem protruding downwardly concentrically within said bore thereby establishing an annular passage concentrically around said head stem;

said head contains a transversely extending groove in which the electrode is held by a clamping means;

said orifice being the outer extremity of a duct extending into the upper portion of said head parallel to said groove and then vertically into communication with said annular passage beneath the lower surface of said head; and said securing means extends into said central head portion from the body portion below said bore securing said head to said body for rotation within said recess.

8. In a cutting and gouging torch having a handle supporting a clamping means for gripping an elongated electrode having a portion of its length exposed and projecting freely toward the work so an arc may be struck and maintained between the electrode tip and work, and at least one air nozzle means connected to a source of high pressure air which flows in a stream from said nozzle means along the exposed length of the electrode toward its tip substantially parallel to the electrode axis and blows melted metal from beneath the arc;

the improvement of a swivel device connecting said clamping means and nozzle to an electrical power cable and a source of high pressure air in which said device comprises a length of torsionally resilient cable concentrically contained within a flexible conduit hose;

an electrically conductive coupling permanently affixed to each of the two ends of said cable and having a longitudinally extending air passage with one end in communication with the space exteriorly of said cable;

an elongated electrically conductive terminal having a fitting at one end disengagably connected to a first of said pairs of couplings and having an internal air passage extending longitudinally thereof communicating with said first coupling air passage;

the other end of said terminal having means for being connected to said torch clamping means with the internal passage of said terminal communicating with said air nozzle;

means rotatably connecting said terminal intermediate its ends to and within one end of said hose for forming an airtight seal therewith such that said terminal and cable attached thereto by said coupling can rotate relative to said hose about their respective longitudinal axes;

an electrically conductive connector having a fitting at one end disengagably connected to the other of said pairs of couplings and having a longitudinally extending air passage communicating with the air passage of said other coupling;

the other end of said connector having means for connecting to a power source and connecting its air passage to a source of high pressure air; and means for connecting said connector to and within the other end of said hose in an airtight relationship.

9. The improved cutting and gouging torch described in claim 8 wherein said means rotatably connecting said terminal within said hose comprises a cylindrical sleeve mounted concentrically around a cylindrical surface of said terminal intermediate its ends such that said sleeve and terminal are freely rotatable in an airtight relationship, and means for securing said sleeve within and to one end of said hose in an airtight relationship.

10. The improved cutting and gouging torch described in claim 9 wherein said couplings each have a hollow female threaded connection in one end and said terminal and said connector each have a threaded male connection at one end that thread into said female connections, said coupling air passage extending from the internal end of each of said female connections in communication with the internal air passage of the male connection of the respective terminal and connector to the exterior of each said coupling overlying the cable.

11. In a cutting and gouging torch having a handle supporting an elongated body with a clamping means for gripping an elongated electrode having a portion of its length exposed to project freely toward the work so an arc may be struck and maintained between the electrode tip and work, and at least one air nozzle means on said body connected through an internal passage extending longitudinally of said body to a source of high pressure air which flows in a free stream from said nozzle means along the exposed length of the electrode toward its tip substantially parallel to the electrode axis and blows metal from beneath the arc;

the improvement wherein said handle is a hollow tube with a longitudinally tapered interior having an internal diameter which decreases in the direction of the tube length from one end;

said body has rear collar means adjacent one end portion projecting transversely outwardly from said body circumferentially thereof with the diameter of said rear collar means being the same as the interior of said tube intermediate its ends;

said body has front collar means spaced from said rear collar means projecting transversely outwardly from said body at least partially circumferentially thereof with the diameter of said front collar means being substantially the same as that of said tube one end of greater diameter;

said body being positioned within said tube with said collar means in contact with the interior wall of said tube; and a wedging element connected to said body intermediate said collar means for controlled movement transversely of said body, whereby the outer end of said wedging element can be brought into wedging engagement with said tube interior to secure the body within the tube.

12. The improved cutting and gouging torch described in claim 11 wherein said clamping means includes a nozzle head mounted for rotation within a recess in the upper front portion of said body in that end portion opposite to said rear collar means;

the upper wall of said recess sloping outwardly and upwardly to define a frustoconical surface;

the lower portion of said head having a frustoconically shaped surface complementary in shape to that of said recess and in which said head lower portion is slidably supported for rotation about its axis;

the upper portion of said head projecting above said body being defined by a vertically extending sidewall;

and means for securing said head to said body for rotation of the lower portion of said head within said recess; and said air nozzle means includes an orifice in said head sidewall connecting to an internal nozzle channel within said head with said channel extending from said orifice to the lower portion of said head within the recess for communication with the longitudinally extending air passage within said body.

13. The improvement in the cutting and gouging torch described in claim 12 wherein said clamping means also includes a clamping arm of electrically conducting material pivotally mounted on said body in an overlying relationship to the front end portion to extend above said nozzle head with the arm being pivotally movable toward and away from said head;

a clamping lever of insulating material affixed to said clamping arm and extending over said handle;

the top surface of said nozzle head containing a groove substantially parallel to the direction of the airstream emitted from said orifice; and biasing means normally pivoting said clamping arm toward said nozzle head to grip the electrode in said groove between said head and said clamping arm.

14. A cutting and gouging torch head on which an electrode is clampingly held by clamping means in an electric arc-air cutting and gouging torch having an elongated metal body with connections to an electric power source and between an air source and internal passages within the body;

said head comprising an upper portion defined by a peripheral sidewall that extends vertically above a recess in said body in which said head is rotatably seated;

an integral lower portion underlying said upper portion having a frustoconically shaped lower face extending downwardly and inwardly from the sidewall of said upper portion and complementary in shape to that of a frustoconically shaped upper portion of a recess that extends downwardly into said body into communication with the internal air passages;

and a centrally located stem smaller in diameter than said recess and extending downwardly concentrically within said recess below said head lower portion;

said stem containing a central bore extending partially upwardly from its lower end and threaded to engage a screw fastener that rotatably holds said head onto the body;

the upper portion of said head containing a plurality of spaced-apart, parallel nozzle passages extending into the upper portion of said body from said sidewall; and said head having a groove extending upwardly from its lower face between said frustoconically shaped face and said stem into communication with each of said nozzle passages.

15. The cutting and gouging torch head of claim 14 wherein said stem is sufficiently long to extend through a hole of substantially the same diameter in the bottom of said recess to protrude slightly below the lower surface of said body.

16. In a cutting and gouging torch head containing a plurality of nozzle passages extending transversely into the head from a forward sidewall area into communication with a vertically extending groove within the head that terminates in a lower face overlying a recess in the upper surface of a head supporting electric arc-air cutting and gouging torch body having connections to an electrical source and between an air source and internal air passages within the body, the improvement wherein the lower face of said head extends downwardly and inwardly from the annular, vertically extending sidewall area of the head that lies above said torch body, said lower face having a frustoconically shaped portion that is complementary in shape to that of the upper face of said recess that extends downwardly into said body into communication with said internal air passages, an integral central stem, smaller in diameter than the minimum diameter of said frustoconically shaped lower head face and minimum diameter of said recess, extending downwardly from the central, lower portion of said head below said frustoconical face to lie concentrically within a lower portion of said recess, the lower portion of said stem containing a central bore extending partially upwardly from its lower end and threaded for engaging a screw fastener that rotatably holds said head onto said body, and said groove extends in an arc about the axis of said stem upwardly into communication with each of said nozzle passages from the lower face of said head in an area between said frustoconical portion and said stem.